(12) United States Patent
Renaud et al.

(10) Patent No.: US 7,321,613 B2
(45) Date of Patent: Jan. 22, 2008

(54) AUTOMATIC IMPEDANCE MATCHING COMPENSATION FOR A SERIAL POINT TO POINT LINK

(75) Inventors: Lyonel Renaud, Gilbert, AZ (US); Sarath Kotamreddy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 10/749,429

(22) Filed: Dec. 31, 2003

(65) Prior Publication Data

US 2005/0141601 A1    Jun. 30, 2005

(51) Int. Cl.
*H04B 1/38* (2006.01)
*H04L 5/16* (2006.01)

(52) U.S. Cl. .............. 375/220; 375/219; 375/257; 326/30

(58) Field of Classification Search .......... 375/219, 375/220, 257; 326/30–32, 34; 327/543
See application file for complete search history.

(56) References Cited

U.S. PATENT DOCUMENTS

| | | | | |
|---|---|---|---|---|
| 5,910,731 | A * | 6/1999 | Polczynski | 326/30 |
| 6,812,734 | B1 * | 11/2004 | Shumarayev et al. | 326/30 |
| 6,836,144 | B1 * | 12/2004 | Bui et al. | 326/32 |
| 2002/0101278 | A1 * | 8/2002 | Schultz et al. | 327/543 |
| 2002/0190746 | A1 * | 12/2002 | Abrosimov et al. | 326/30 |

OTHER PUBLICATIONS

Ravi Budruk, et al., "PCI Express System Architecture", PC System Architecture Series, MindShare, Inc., Addison-Wesley copyright 2004, ISBN #0-3212-15630-7 (Contents, pp. vii-xxxvii; Part Three The Physical Layer—Chapter 11 Physical Layer Logic, pp. 397-451; and Chapter 12 Electrical Physical Layer, pp. 453-486).

"PCI Express™ Base Specification Revision 1.0a", Apr. 15, 2003 (Incorporated Errata C1-C67 and E1-E4.17) PCI Express (Contents, pp. 3-8; and Section 4.2.7 Clock Tolerance Compensation through Section 4.2.8 Compliance Pattern, pp. 200-201).

* cited by examiner

*Primary Examiner*—Phuong Phu
(74) *Attorney, Agent, or Firm*—Blakely, Sokoloff, Taylor & Zafman LLP

(57) ABSTRACT

An integrated circuit (IC) device that has an analog front end with an I/O buffer is reset. The I/O buffer has a driver circuit to transmit a stream of information over a serial point to point link, and a receiver circuit to receive a stream of information over the link. Digitally-controllable transmission line terminations are provided for the driver and receiver circuits, respectively. A digitally-controllable reference signal level is also provided for the I/O buffer. A number of impedance matching compensation values are automatically calibrated against one or more reference resistors, by calibrating a first value and then a second value, and a third value. These calibrated values are automatically applied to set the reference signal level, driver termination, and receiver termination, respectively. Other embodiments are also described and claimed.

17 Claims, 8 Drawing Sheets

AUTOMATIC IMPEDANCE MATCHING COMPENSATION FOR A SERIAL POINT TO POINT LINK

BACKGROUND

An embodiment of the invention is generally related to serial, point to point interconnect technology suitable for communicatively coupling elements of an electronic system, and particularly to those which have certain aspects that are in accordance with the PCI Express Base Specification 1.0a (Errata dated 7 Oct. 2003) ("PCI Express"). Other embodiments are also described.

An electronic system is composed of several elements that are designed to communicate with one another over an input/output (I/O) interconnect of the system. For instance, a modern computer system may include the following elements: a processor, main memory, and a system interface (also referred to as a system chipset). An element may include one or more integrated circuit (IC) devices. For example, the system chipset may have a memory controller hub (MCH) device that allows the processor to communicate with system memory and a graphics element. In addition, an I/O controller hub (ICH) device may be provided that connects the processor and memory, via the MCH, to other elements of the computer system such as mass storage devices and peripheral devices. In that case, a separate, point to point link such as one defined by PCI Express may be used to allow bi-directional communication between a pair of devices, e.g. the processor and the MCH, the MCH and the graphics element, and the ICH and the mass storage device.

A PCI Express point to point link may have one or more lanes that can operate simultaneously. Each lane has dual, unidirectional paths, which are also simultaneously operable. Each path may have a single set of transmitter and receiver pairs (e.g., a transmitter in a port of Device A, a receiver in a port of Device B). In that case, the transmitter and receiver may drive and sense a transmission medium such as a pair of metal traces in a printed wiring board that may traverse a board-to-board connector. Alternatively, other transmission media may be provided, such as optical fiber.

A point to point link serves to transport various types of information between devices. At a so-called "higher layer", however, communications between peers in two devices (also referred to as a requester and a completer) may be conducted using transactions. For example, there are memory transactions that transfer data to or from a memory-mapped location. Under PCI Express, there are also message transactions that communicate miscellaneous messages and can be used for functions like interrupt signaling, error signaling, and power management.

There may be three abstract layers that "build" a transaction. The first layer may be the Transaction Layer, which begins the process of turning a request or completion data coming from a device core into a data packet for a transaction. The second architectural build layer is called the Data Link Layer; it ensures that packets going back and forth across a link are received properly (via techniques such as error control coding). The third layer is called the Physical Layer. This layer is responsible for the actual transmitting and receiving of the packet across the link. The Physical Layer in a given device interacts with its Data Link Layer (in the same device) on one side, and with the metal traces, optical fiber, or other transmission medium that is part of the link, on another side. The Physical Layer may contain circuitry for the transmitters and receivers, parallel to serial and serial to parallel converters, frequency and phase control circuits, and impedance matching circuitry. It may also contain circuitry for logic functions needed for its initialization and maintenance. A layered architecture may permit easier upgrades by, for example, allowing reuse of essentially the same Transaction and Data Link Layers, while upgrading the Physical Layer (e.g., increasing transmit and receive clock frequencies).

An example of the behavior of the Physical Layer is now given. Once power up occurs, the Physical Layers on both Device A and Device B are responsible for initializing the link and making it ready for transactions. This initialization process may include determining how many lanes should be used for the link, and at what data rate the link should operate. Sometime after the link is properly initialized, a memory read request is initiated in Device A. Eventually, a packet that includes this read request arrives at Device A's Physical Layer, including headers, error control information, and sequence numbers added by the higher layers. The Physical Layer then takes this packet of data and transforms it into a serial data stream (perhaps after adding framing data to it), and transmits the stream using, for example, an electrical, differential signal having predefined timing rules.

Once the Physical Layer in Device B sees the signal appear at its receiver input, it samples the signal to recover the data stream, and builds the stream back into a data packet (e.g., after removing the framing). The packet is then passed up to the Data Link Layer in Device B, which strips the headers and checks for errors; if there are no errors, the packet is passed up to the Transaction Layer where the memory read request is extracted and then sent to the appropriate logic function to access the locations specified in the request.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
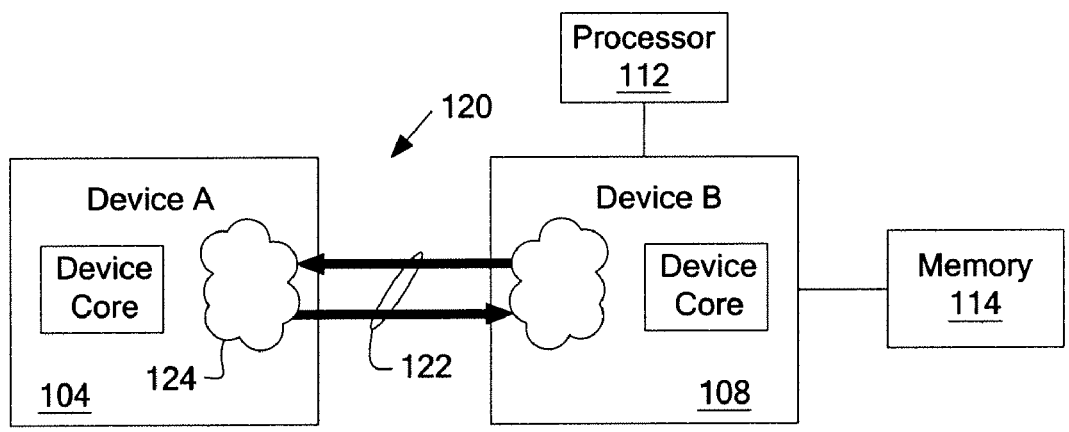
FIG. 1 illustrates a pair of integrated circuit devices that are coupled to each other via a serial point to point link.

An embodiment of the invention is directed to automatically compensating an analog front end of a serial, point to point link, for purposes of transmission line impedance matching. FIG. 1 illustrates a pair of integrated circuit devices that are coupled to each other via a serial point to point link. The IC devices 104 (Device A) and 108 (Device B) may be part of a computer system that contains a processor 112 and main memory 114. In this example, a serial point to point link 120 is used to communicatively couple the core of Device B with that of Device A. The link 120 has dual, unidirectional paths 122, with link interface 124 that serves to interface with the device core of each respective Device A and B.

In this embodiment, Device B is referred to as the root complex of the computer system and provides the processor 112 with I/O access to, for instance, a graphics element in Device A. The root complex may be partitioned into a graphics and memory controller hub (GMCH) and an I/O controller hub (ICH). The ICH would act as a further interface between the GMCH and other I/O devices of the system, including a non-volatile mass storage device, a pointing device such as a track pad or mouse, and a network interface controller (not shown). The point to point link 120 may be duplicated for communicatively coupling the Device B to the processor 112 and the main memory 114. Other platform architectures that feature the point to point link 120 are also possible.

Figure 2:
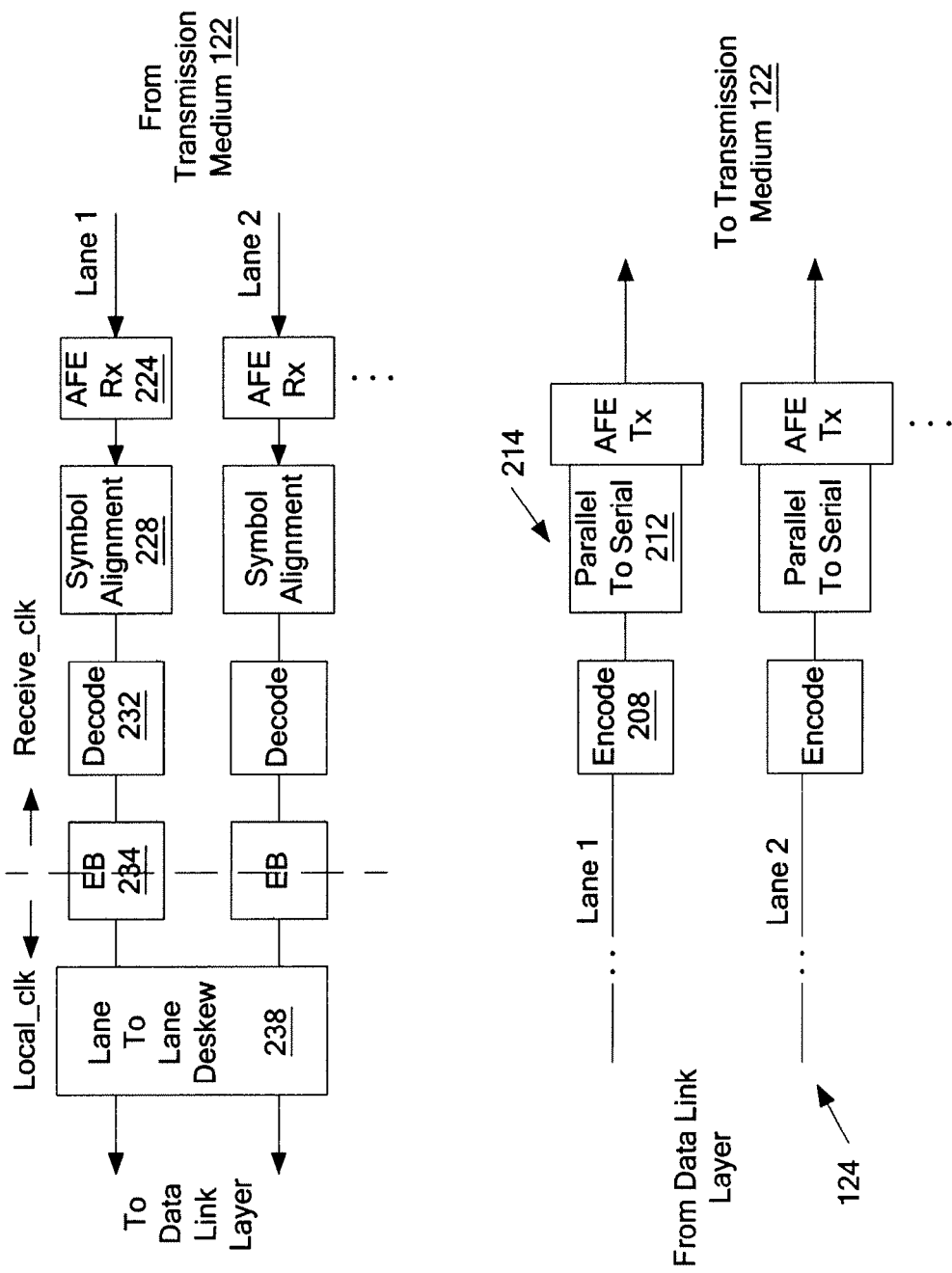
FIG. 2 shows a block diagram of part of the link interface circuitry used to implement the serial point to point link in an integrated circuit device.

The interface 124 of FIG. 1 may be viewed as implementing the multiple layer architecture (described above in the Background) for a serial point to point link. Some details of the interface 124 are illustrated in FIG. 2. The interface 124 supports independent transmit and receive paths between the transmission medium 122 and the Data Link Layer of its respective device 104, 108. In the transmit path, information in the form of data packets arrive from the Data Link Layer and are divided into symbols that are encoded by an encode block 208. A purpose of the encoding by block 208 is to embed a clock signal so that a separate clock signal need not be transmitted into the transmission medium 122. This encoding may be the well known 8B-10B where an eight bit quantity is converted into a 10 bit quantity; other encoding schemes are possible. In some cases, such as where a separate strobe or clock signal is transmitted in the medium 122, there may be no need for such encoding.

Following encoding in block 208, the units of data (referred to here as symbols) are processed by a parallel to serial block 212 of an analog front end (AFE) transmit block 214 to yield a stream of bits. Note that a "bit" as used here may represent more than two different states, e.g. a binary bit, a ternary bit, etc. The term "bit" is used merely here for convenience and is not intended to be limited to a binary bit. The bit stream is then driven into the transmission medium 122. As explained above in the Background, this transmission medium may be a pair of metal traces formed in a printed wiring board. Other forms of the transmission medium 122 may alternatively be used, such as an optical fiber.

The series of blocks 208-214 may serve a single lane of the point to point link 120 (FIG. 1). In general, there may be more than one lane in the point to point link 120, so that a packet received from the Data Link Layer may be "striped" across multiple lanes for transmission.

Turning now to the receive side of the interface 124 shown in FIG. 2, each lane has its associated AFE receive block 224, which serves to receive a stream of information from the transmission medium 122, by for example sampling a signal in the transmission medium 122. The AFE receive block 224 translates between signaling of the transmission medium 122 and signaling of the IC device 104 (e.g., on-chip, complementary metal oxide semiconductor, CMOS, logic signaling). As will be explained below, the stream of information represents sequences of M-bit symbols (where M is an integer greater than 1) that have been transmitted by the Device B over the serial point to point link 120 (see FIG. 1).

The stream of bits provided by the AFE receive block 224 is fed to symbol alignment logic 228 which serves to align or lock onto the symbols that have been received. In other words, and as will be explained below, the symbol alignment logic 228 will demarcate the correct symbol boundaries within the received bit stream, for use by subsequent sections of the Physical Layer in the device 104.

The symbol-aligned bit stream may then be fed to decode block 232 which undoes the encoding performed by encode block 208 (e.g., 10B-8B decoding, to yield symbols of information consisting of eight binary bits each).

The decoded symbols are then fed to an elastic buffer, EB 234. The EB 234 serves to compensate for any differences in the tolerance of the rate at which the symbols were transmitted in Device B and a local clock signal (local_clk) of Device A. The local_clk is used to unload symbols from the EB 234, as well as in some cases operate parts of lane to lane deskew circuitry 238 as explained below (in the case where the link 120 is composed of more than one lane). It should be noted that the decode block 232 (if provided) may be placed further downstream, e.g. at the output of the EB 234 or at the output of the deskew circuitry 238.

Automatic Impedance Matching Compensation

Figure 3:
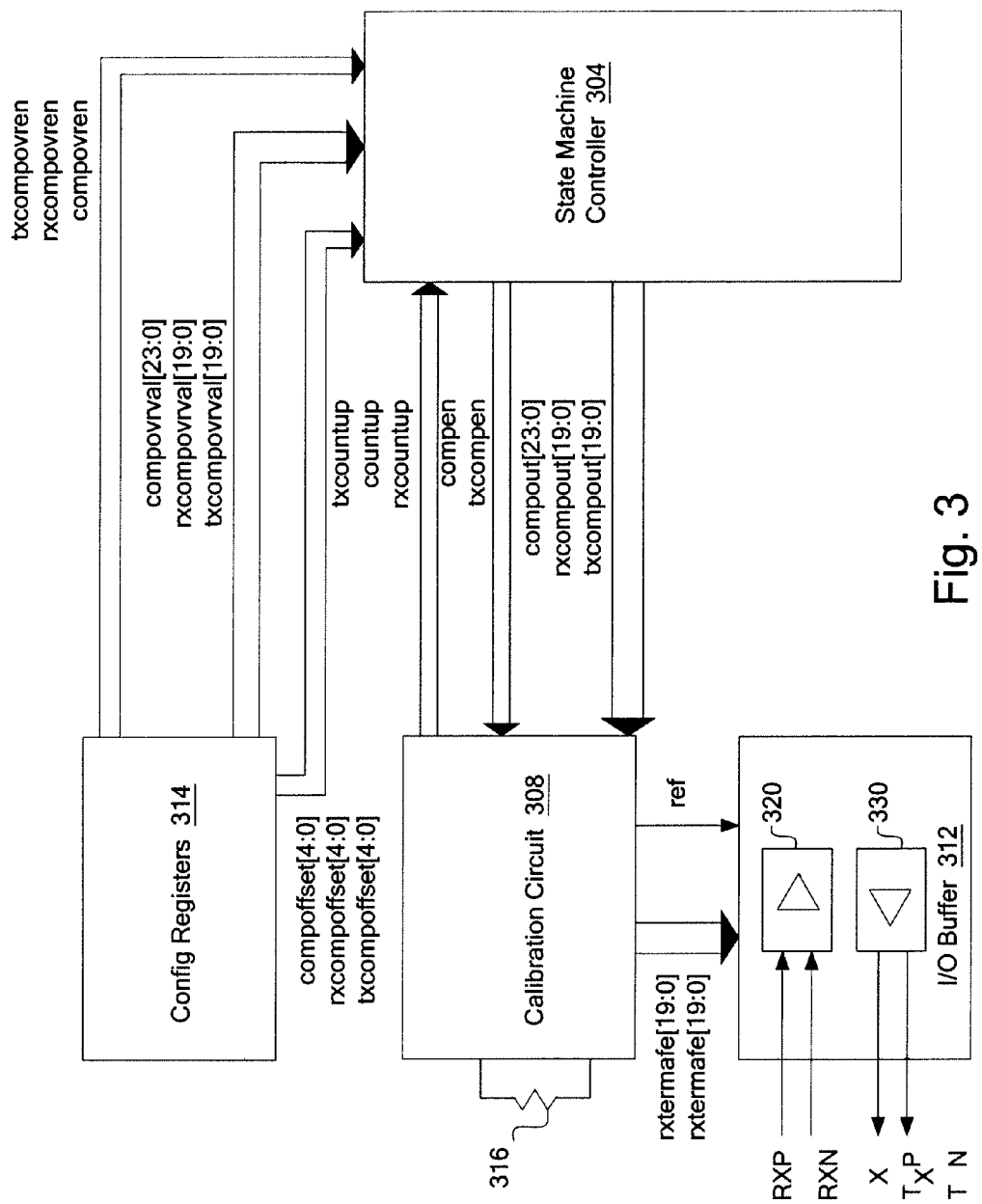
FIG. 3 depicts a block diagram of several function blocks in the link interface involved in the automatic impedance matching compensation.

FIG. 3 depicts a block diagram of several function blocks in the link interface 124 (see FIG. 1) that are involved in automatic impedance matching compensation. The functional blocks may be implemented on-chip, in an IC device that has an analog front end (AFE) of the serial point to point link. The link may have multiple lanes, where for each lane there is an I/O buffer 312. A driver circuit 330 is to transmit a stream of information over the link, while a receiver circuit 320 is to receive a stream of information over the link. In this embodiment, the driver and receiver circuits have differential outputs and inputs, i.e. txp-txn and rxp-rxn, respectfully, that may be capacitively coupled to the transmission medium of the link.

The driver and the receiver circuits have digitally-controllable transmission line terminations, respectively. In addition, the I/O buffer 312 has a digitally-controllable reference signal level, such as a DC bias voltage or current. The terminations and the reference signal level determine the matching impedance that is presented to the transmission medium 122, and will be adjusted to compensate for changes in, for example, operating temperature and supply voltage. In the example shown, the receiver (rx) and transmitter or driver (tx) terminations are controlled by separate, 20-bit binary values rxtermafe [19:0] and txtermafe [19:0], while the reference signal level is determined by a 24-bit binary value compout [23:0]. Of course, the 20-bit and 24-bit values are merely examples as larger or smaller size variables may alternatively be suitable. In addition, although the figure shows that the rxtermafe and txtermafe values are provided to the I/O buffer 312 from the block representing the calibration circuit 308, the actual implementation of the circuitry that provides these values may be part of another functional block, such as a compensation state machine controller 304.

The controller 304 is designed to direct the process of automatic impedance matching compensation using a number of predefined states (examples of which will be given below). The controller 304 will transition through first, second, and third states, wherein in each state the controller signals the calibration circuit 308 to generate a particular signal level. A counter is initialized, and a variable resistance of the calibration circuit is controlled, to change the generated signal level until the level has reached a predefined threshold. This threshold may be set based on the value of an external reference resistor 316. Alternatively, the threshold may be set independently of the reference resistor 316 (as in the example shown in FIG. 5 below). The generated signal level may be incrementally changed under control of a clock circuit (not shown), where the clock circuit also drives the counter. There is an association made between the present value of the counter and the present level (voltage or current) of the generated signal. Thus, when the threshold signal level has been reached, an analog comparator may signal the counter to stop counting. The controller 304 will update either the reference level, the driver termination, or the receiver termination of the I/O buffer, based on the stopped value of the counter (or one that is close to the stopped value). The same counter may be shared by all three states, or a separate counter may be provided for each state.

According to an embodiment of the invention, the controller is to enter the reference level calibration state before entering the driver termination (tx) calibration state. This is so that in the latter state, the calibration value (from the counter) is obtained using the variable resistance (in the calibration circuit 308) that has been set in the first state. This allows for a more compact analog circuit realization, as well as a speedier calibration process overall.

In addition, the structure of the functional blocks shown in FIG. 3 are such that the calibration process does not place the actual termination or reference levels used in the I/O buffer 312 within the "control loop" that is formed between the calibration circuit 308 and the controller 304. This loop is formed by the controller providing the calibration circuit with enable signals compen and txcompen which are used to configure the calibration circuit 308 for the calibration process of each of the three states mentioned above. The controller 304 provides the calibration circuit 308 with changing binary numbers compout [23:0] (to set the digitally-controllable reference signal level), rxcompout [19:0] (to set the digitally-controllable transmission line termination used for calibrating the receiver circuit 320), and txcompout [19:0] (to set the digitally-controllable transmission line termination that is used to calibrate the driver circuit 330). Calibrated values for these variables are determined by the controller 304 in response to the countup, rxcountup, and txcountup signals being asserted (or exhibiting a certain pattern) by the calibration circuit 308. The updates to the actual terminations and reference levels used in the driver circuit 330 and receiver circuit 320 are made, in this embodiment, by the controller 302 providing a separate pair of binary values rxtermout and txtermout to the calibration circuit 308, which in turn provides the actual values for setting the digitally variable termination and reference levels in the I/O buffer 312. The difference between rxtermout and rxcompout, for example, may be an offset value that has been combined with rxcompout (by the controller 304). The offset value may be stored in a configuration register 314 and set via a host or user programmable interface (e.g., under control of a platform management unit of a computer system). The use of an offset value makes the design applicable to a wider range of impedance matching (e.g., a greater range of termination resistance values or signal reference values).

In the embodiment of FIG. 3, the reference signal level of the I/O buffer 312 is set by an analog output ref provided by the calibration circuit 308 and set by the controller 304. Alternatively, this analog reference level may be generated in the circuitry of the I/O buffer 312, in accordance with a binary value obtained from the calibration circuit 308 or controller 304.

The configuration registers 314 may be used to store override compensation values that may be used in, for example, special test modes of operation. In that case, the IC device, instead of applying the calibrated compensation values, applies one or more of the override compensation values (in response to their respective enable signals txcompovren, rxcompovren, and compovren being asserted), to set any one of the reference level, driver termination, and receiver termination of the I/O buffer 312.

Although FIG. 3 shows a single I/O buffer 312, which may drive and sense a single lane of the serial point to point link, it is expected that with links having multiple lanes, the same, calibrated compensation values may be applied to set the reference level, driver termination, and receiver termination in the I/O buffer of every lane of the link.

Figure 4:
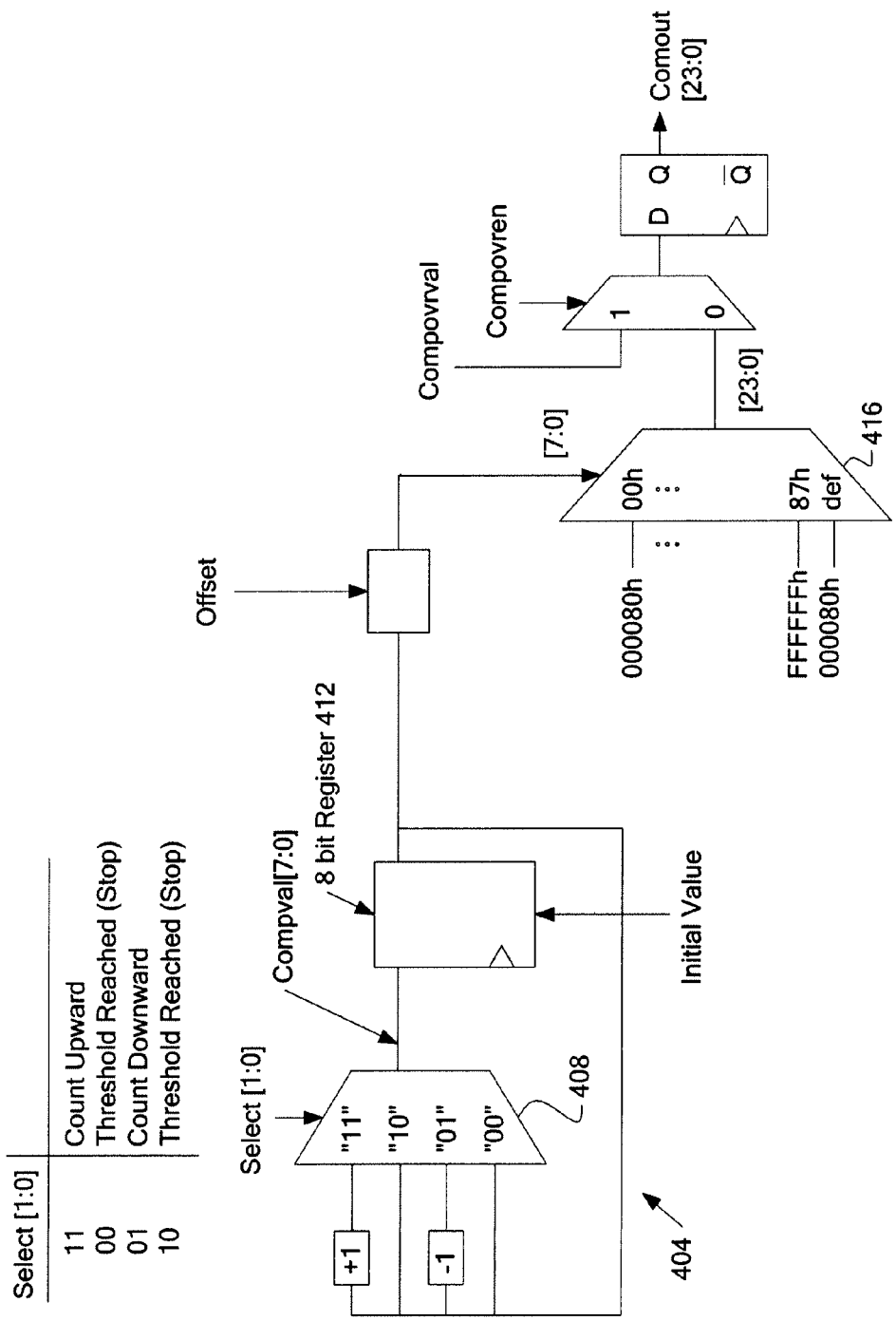
FIG. 4 shows a logic diagram of an example part of a compensation state machine controller.

Turning now to FIG. 4, a logic diagram of an example part of the state machine controller 304 is shown. This part of the state machine controller 304 implements a counter 404 that can count upward and downward on command. The selection inputs of a multiplexor 408 are used to command the counter to count upward until a threshold has been reached, or to count downward until another threshold has been reached. The count value is stored in this example in an 8-bit register 412. An initial value may be loaded into the register 412 upon the controller 304 entering the respective state associated with the calibration being performed, that is driver termination, receiver termination, or I/O buffer reference level.

The output of the counter 404 may be combined with an offset value (provided from a configuration register 314 FIG. 3). This adjusted value is then used as the selection input to a lookup table or multiplexor 416. In this example, the select input to the multiplexor 416 is an 8-bit value, which is decoded into a 24-bit value. If the compensation override signal is not asserted, then this 24-bit value is forwarded as the compout [23:0] that will be used to actually set the variable termination or reference level in the calibration circuit 308. The same circuit illustrated in FIG. 4 may be used to generate all the binary values for all three calibration operations, including driver termination, receiver termination, and I/O buffer reference level.

Figure 5:
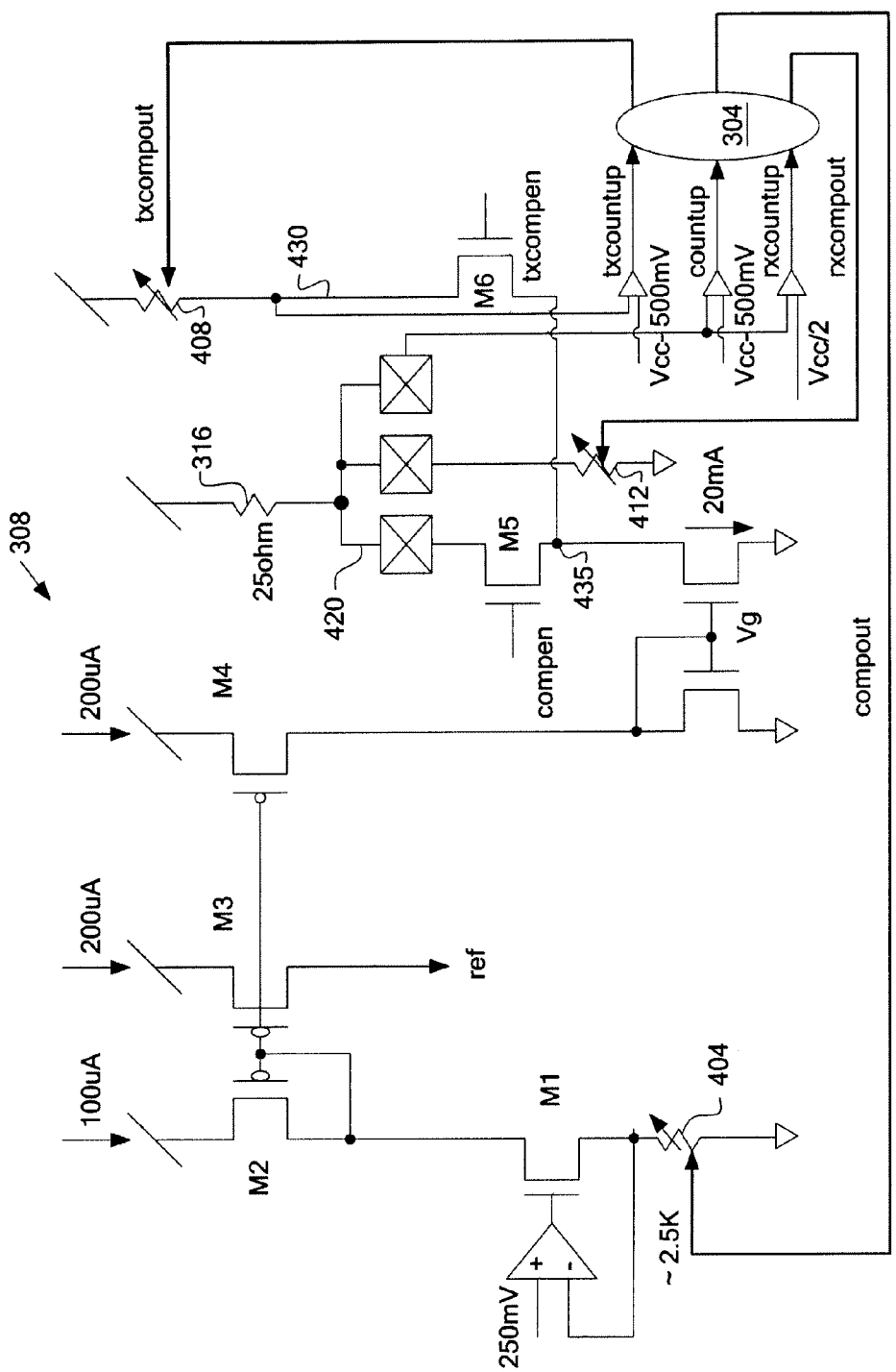
FIG. 5 shows a circuit diagram of part of an example calibration circuit.

In FIG. 5, an example schematic of the calibration circuit 308 is shown. This particular implementation uses a complementary metal oxide semiconductor (CMOS) fabrication process, although other integrated circuit fabrication processes may alternatively be used. The multi-bit binary values (provided by the controller 304) are indicated by the thick lines, whereas the analog signals are present on the thin lines. Beginning with the I/O buffer reference level, this reference level is, in this example, a current that is set by the binary value fed to the variable resistance 404 which is part of the circuit that includes transistors M1-M3. The signal that is actually calibrated, by the process of adjusting the variable resistance 404, is in this embodiment, a voltage at node 420. The voltage at node 420 also happens to be the signal that will be calibrated for the receiver termination process. In the latter process, the binary value rxcompout is used to set the variable resistance 412 to calibrate the voltage at node 420. As to the driver termination, that aspect is calibrated by controlling the variable resistance 408, to calibrate the voltage at node 430.

In the example shown, all three calibration processes rely on a single, external reference resistor 316 (which in this example has a nominal resistance of 25 ohms). Generally, however, up to three different resistors may be used, one for each part of the overall calibration process, and where each of these resistors may have different values. In addition, another alternative is to calibrate a current, rather than the voltages at nodes 420 and 430.

Figure 6:
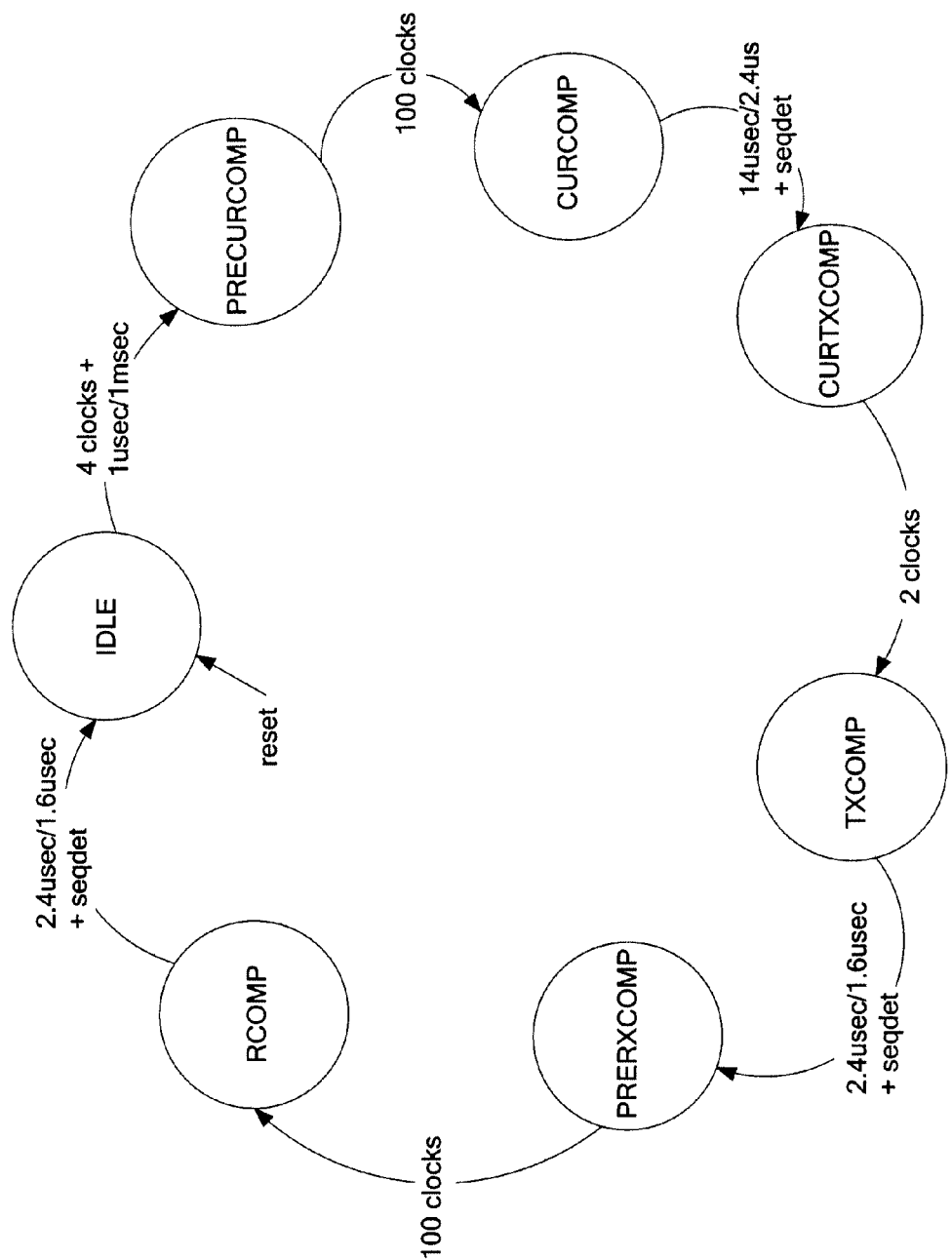
FIG. 6 is a state diagram of an example compensation state machine controller.

According to an embodiment of the invention, the controller 304 is designed to enter the state in which the reference level is calibrated, before entering the state in which the driver termination is calibrated. Applying this to the example circuit diagram of FIG. 5, the reference level is calibrated by adjusting the variable resistance 404 until the countup signal is asserted. The controller 304 would then transition to the next state, in which the enable signal txcompen would be asserted, without deasserting compen. This helps avoid a voltage spike at the node 435, if the compen signal were deasserted prior to asserting txcompen. Meanwhile, the setting for the variable resistance 404 obtained in the previous state (when calibrating the ref signal) is retained. Such a technique allows the overall process of compensation to be performed relatively quickly and without glitches. This may be particularly desirable in situations where the compensation process is applied repeatedly, not just during the initialization of the serial point to point link, but also "dynamically" during normal or active operation of the link. FIG. 6 below illustrates an example of the different states that may be defined for the controller 304 to perform the overall compensation process.

Referring now to FIG. 6, the state diagram may be described beginning with the Idle state which the state machine will enter upon a power on reset, for example. Operation of the state machine is according to a clock (not shown). Four clocks after the deassertion of the reset signal, the controller will transition to the Precurcomp state. Of course, the four clocks is just an example as fewer or a greater number of clocks may alternatively be specified. However, on subsequent iterations of the compensation process, the transition from Idle to Precurcomp is to occur after a much longer period of time, in this case either one microsecond or one millisecond. A purpose of the Precurcomp state is to allow the comparators (see FIG. 5) in the calibration circuit 308 to settle prior to their operation. As an example, 100 clocks has been selected in this embodiment for the wait period.

The first calibration state in this embodiment may be Curcomp, where the reference signal level of the I/O buffer is calibrated. In one embodiment, the starting value of the counter 404 (FIG. 4) is selected to correspond to the midpoint of the thermometer encoded full range of compout, i.e. 00ff87h. Next, the enable signal compen is asserted thereby activating the signal level at node 420 (FIG. 5). Depending on whether this signal is less than or greater than a predefined threshold (here Vcc-500 mV), the countup signal will either indicate an upward or downward direction to the controller 304.

The counter 404 (FIG. 4) is allowed to increment or decrement (according to the countup signal). If the countup signal toggles before a timer expires, then the value of compout will be applied to update the reference level of the actual I/O buffer 312 (FIG. 3). As an alternative to just a toggle, the point at which the threshold has been met may be defined as a particular sequence of bits (a signature or pattern) exhibited by the countup signal (e.g., 010 or 101).

Transition from the Curcomp state to the next defined state, here Curtxcomp, occurs either upon the timer expiring or after the compensation value has been updated. In the Curtxcomp state, both enable signals compen and txcompen are asserted albeit for merely a relatively short period of time (here two clocks). As mentioned above, this helps maintain the common mode voltage at the source node 435 that is shared by the two M-channel devices M5-M6 (see FIG. 5).

The next state is the second state in which a calibration process is performed, in this example being Txcomp (driver termination calibration). For the driver termination process, the counter 404 (FIG. 4) may be initialized to the lowest value of the thermometer encoded range in compout. Once again, incrementing or decrementing compout depends on the txcountup signal received from the calibration circuit 308. The transition out of the Txcomp state occurs either when a timer expires, or sooner if a predefined signature has been detected (e.g., 101 or 010) in txcountup. When the predefined signature has been detected, the counter 404 is stalled, and the value txcompout (which may or may not be obtained by combining an offset value with the output of the register 412 in FIG. 4) is used to update the driver termination in the I/O buffer 312.

The transition between Txcomp and the next calibration state Rxcomp (receiver termination) may go through an intermediate state Prerxcomp. Once again, this intermediate state may be used to allow any comparator or other analog circuitry of the calibration circuit 308 to settle, prior to operation. The transition into this intermediate state is once again governed by either the expiration of the timer or detecting a certain signature in txcountup which indicates that the threshold level has been met and that a signal has been calibrated.

Upon entering the Rxcomp state, the state machine in this embodiment may deassert both compen and txcompen, instead of asserting another control signal. For the calibration of the receiver termination, variable resistance 412 is adjusted until it is essentially equal in value to the external reference resistor 316. The starting value of the counter 404 (FIG. 4) may be either the lowest or the highest thermometer encoded value in compout. The counter may then be instructed to count upward or downward (depending on what was the initial condition) until the predefined signature sequence is detected in rxcountup (prior to expiration of the timer). Once again, the output of the register 412 may or may not be combined with an offset, and provided to the lookup table (represented by multiplexor 416, FIG. 4), to yield rxcompout. This value is then applied to update the receiver termination in the actual I/O buffer 312 (FIG. 3). Thereafter, the state machine controller 304 will transition back into the idle state where the calibration process will repeat, albeit with different intermediate wait periods and update intervals, as mentioned above and shown in FIG. 6.

It should be noted that in the above-described processes, the updating of either the reference level, the driver termination, or the receiver termination may be based on a value that is approximately the same as a stopped value of the counter, rather than exactly the stopped value of the counter. For example, if the counter value for the reference level is being incremented or decremented and is then stalled, the actual compensation value that will be used to update the reference level in the I/O buffer may be based on the counter value that is one increment smaller than the stopped value of the counter. That is because the calibration process may only estimate the ideal compensation value for a given situation.

Note also that the calibration circuit 308 and the state machine controller 304 may be stand alone functional blocks that do not rely upon the core logic of the IC device to be running. Rather, a clock signal and the power supply voltage may be all that is needed to launch the controller 304 and calibration circuit 308 into the calibration process described above. Indeed, the provision of the offset values or the override values from the configuration registers 314 are optional in that they do not need to be implemented in all embodiments of FIG. 3.

Other System Embodiments

The above-described link interface circuitry and methodology may also be implemented in IC devices that are designed to communicate via a serial, point to point interconnect technology that provides isochronous support for multimedia. Isochronous support is a specific type of QoS (Quality of Service) guarantee that data is delivered using a deterministic and time-dependent method. Platform-based isochronous support relies on a documented system design methodology that allows an application that requires a constant or dedicated level of access to system resources to gain the required bandwidth at a given time interval.

Figure 7:
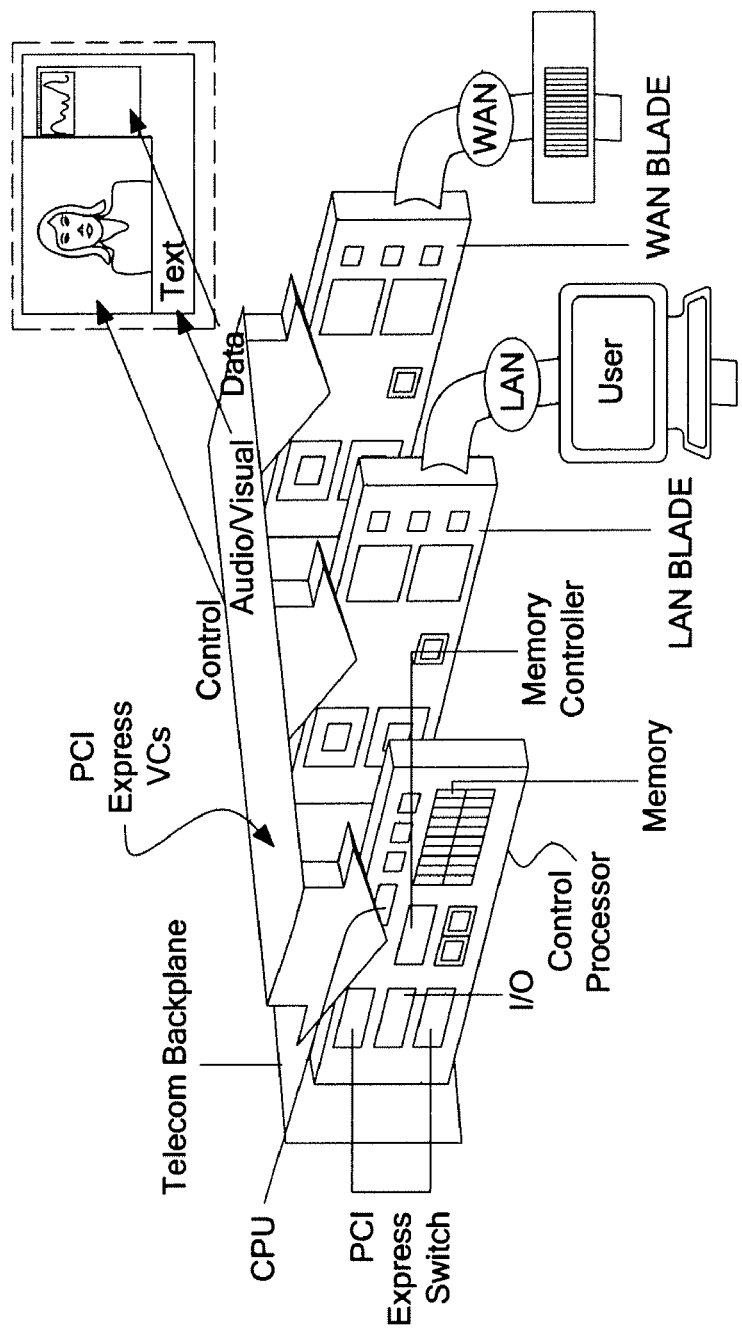
FIG. 7 identifies the various elements of a multi-media desktop personal computer some of which are communicationally coupled to each other via PCI Express virtual channels (VCs).

An example is that of watching an employee broadcast that originates from the company's CEO, on a desktop while working on a report, as shown in FIG. 7. Data is routed from the intranet into the desktop main memory where the application utilizes the data to create an audio stream sent to the user's headphones via an add-in card and a video stream sent to the display via a graphics controller. If simultaneous operations are occurring within the desktop personal computer (PC), such as disk reads, data coming off the Internet, word processing, email, and so on, there is no guarantee that the audio and video stream will be truly glitchless. Data is delivered on a "best effort" method only. The user may experience skips or stalls as applications compete for the same resources. Isochrony in PCI Express solves this problem by establishing a mechanism to guarantee that time-sensitive applications are able to secure adequate system resources. For example, in FIG. 7, the video time-sensitive data would be guaranteed adequate bandwidth to prevent skips at the expense of non-critical data such as email.

The above-described link interface circuitry and methodology may also be implemented in IC devices that are designed to communicate via a serial point to point link technology that is used in communications equipment, from embedded applications to chassis-based switching systems. In advanced switching, mechanisms are provided to send packets peer-to-peer through the switch fabric. These markets also benefit from the server class hardware-based error detection that is available with PCI Express. There may be two main types of usages within communications equipment, control plane processing and data plane processing. Control plane refers to the control and configuration of the system. The serial link may be used as the interface to configure and control processors and cards within a large number of systems. Chassis-based building switches typically have various cards that can be inserted and used. Chassis-based switches may offer field-upgradeability. Most switching systems offer the ability to only populate half of the chassis initially and add cards with additional ports or faster speed connections as demand or the number of users increase. The serial link technology could be used as a control plane interconnect to configure and monitor the different types of cards installed within the system. The enumeration and established configuration protocol within PCI Express, for example, lends itself to a low pin count, high bandwidth interface to configure cards and services.

The data plane refers to the actual path that the data flows. In the data plane, an advanced switching extension may define mechanisms to encapsulate and send PCI Express data packets across peer-to-peer links through the switch fabric.

The PCI Express core architecture may provide a solid foundation for meeting new interconnect needs. The Advanced Switching (AS) architecture overlays on this core and establishes an efficient, scalable, and extensible switch fabric through the use of a specific AS header inserted in front of the PCI Express data packet at the Transaction Layer. AS switches only examine the contents of the header that provide routing information (where to send the packet), traffic class ID (quality of service information), congestion avoidance (for preventing traffic jams), packet size, and protocol encapsulation. By separating the routing information, switch designs are simpler and cost-effective. Additionally, adding an external header to the packet enables the switch fabric to encapsulate any number of existing protocols.

Figure 8:
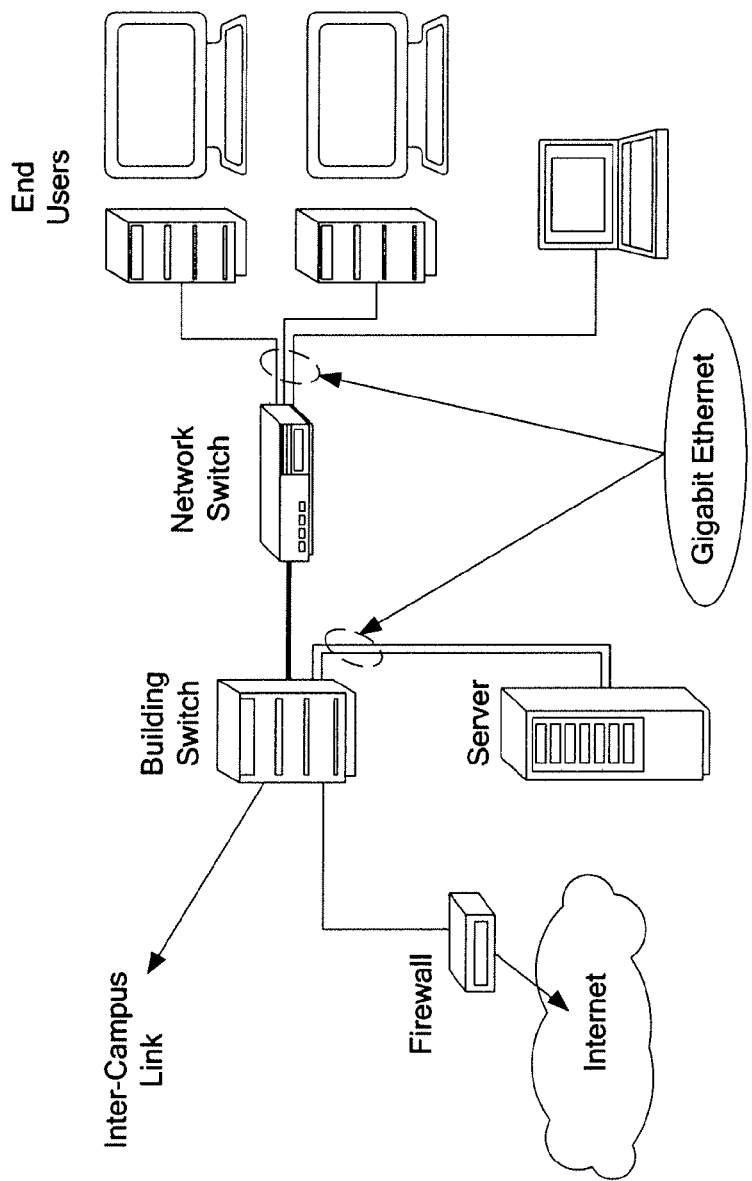
FIG. 8 depicts a block diagram of an enterprise network.

The above-described link interface circuitry and methodology may also be implemented in IC devices that are designed to communicate via a serial point to point interconnect technology that is used for network connections (in place of Gigabit Ethernet, for example). The network connection may be for corporate mobile and desktop computers for sharing files, sending emails, and browsing the Internet. Servers as well as communications equipment may be expected to implement such network connections. An example of such a network connection within the enterprise network is shown in FIG. 8.

Although the above examples may describe embodiments of the invention in the context of combinational and sequential logic circuits, other embodiments of the invention can be implemented by way of software. For example, some embodiments may be provided as a computer program product or software which may include a machine or computer-readable medium having stored thereon instructions which may be used to program a computer (or other electronic devices) to perform a process according to an embodiment of the invention. In other embodiments, operations might be performed by specific hardware components that contain microcode, hardwired logic, or by any combination of programmed computer components and custom hardware components.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that features an embodiment of the invention.

To summarize, various embodiments of a method and apparatus for automatic impedance matching compensation of a serial point to point link have been described. In the foregoing specification, the invention has been described with reference to specific exemplary embodiments thereof. It will, however, be evident that various modifications and changes may be made thereto without departing from the broader spirit and scope of the embodiments of the invention as set forth in the appended claims. For example, although the system embodiment has been described using the serial point to point link as a chip to chip connection between two devices on a printed wiring board such as in a desktop, server, or notebook computer, the impedance matching compensation technique may also be used with serial point to point links that are part of an external bus for connecting the computer to a peripheral such as a keyboard, monitor, external mass storage device, or camera. The point to point link may be used in not only computer systems, but also dedicated communications products such as mobile phone units, telecommunication switches, and data network routers. The specification and drawings are, accordingly, to be regarded in an illustrative rather than a restrictive sense.

What is claimed is:

1. A method comprising:
   resetting an integrated circuit (IC) device that has an analog front end (AFE) with an I/O buffer, the I/O buffer having a driver circuit to transmit a stream of information over a serial point to point link, and a receiver circuit to receive a stream of information over the link, the driver and the receiver circuits having digitally-controllable transmission line terminations, respectively, the I/O buffer having a digitally-controllable reference signal level;
   automatically calibrating a plurality of impedance matching compensation values against a reference resistor, by a) calibrating a first compensation value, then b) calibrating a second compensation value, and c) calibrating a third compensation value; and
   automatically applying the calibrated first, second and third compensation values to set said reference signal level, driver termination, and receiver termination, respectively.

2. The method of claim 1 wherein the applying includes combining an offset value with some of the calibrated plurality of compensation values.

3. The method of claim 1 further comprising writing to a plurality of software-accessible registers of the IC device an override compensation value, wherein the IC device, instead of applying the calibrated plurality of compensation values, applies the override compensation value to set one of the reference level, driver termination, and receiver termination in the I/O buffer.

4. The method of claim 1 further comprising automatically applying the same calibrated plurality of compensation values to set the reference level, driver termination, and receiver termination in an I/O buffer of every lane in a plurality of lanes of the link.

5. The method of claim 1 wherein the plurality of compensation values calibrated against a single reference resistor.

6. An integrated circuit (IC) device comprising:
   an analog front end (AFE) having an I/O buffer, the I/O buffer having a driver circuit to transmit a stream of information over a serial point to point link, and a receiver circuit to receive a stream of information over the serial point to point link, the driver and the receiver circuits having digitally-controllable transmission line terminations, respectively, the I/O buffer having a digitally-controllable reference level;
   a calibration circuit to calibrate a plurality of signal levels against an external, reference resistor using a plurality of comparators and a plurality of digitally-controllable variable-resistances; and
   a state machine controller to transition through a first state, a second state, and a third state, wherein in each state, the controller is to a) signal the calibration circuit to generate one of the plurality of signal levels, b) initialize a counter, c) control one of the variable-resistances of the calibration circuit to change the generated one of the signal levels until an output of the comparator has signaled the counter to stop counting, and d) update one of i) the reference level of the I/O buffer, ii) the driver termination in the I/O buffer, and iii) the receiver termination in the I/O buffer, based on a value that is approximately the same as a stopped value of the counter,
   and wherein the state machine controller enters the first state before entering the second state so that in the second state, the stopped value of the counter is obtained using the variable-resistance, in the calibration circuit, as set in the first state.

7. The IC device of claim 6 further comprising:
   a plurality of software-programmable registers whose content is to signal the state machine controller to override the update in d) and instead update one of i) the reference level of the I/O buffer, ii) the driver termination in the I/O buffer, and iii) the receiver termination in the I/O buffer, based on the content of one of the registers.

8. The IC device of claim 6 further comprising:
   a plurality of software-programmable registers whose content is to provide the state machine controller with an offset, and
   wherein the state machine controller is to perform the update based on said value as combined with the offset.

9. The IC device of claim 6 wherein the state machine controller is to, after a power on reset of the IC device, enter an idle state in which the controller signals the calibration circuit to disable the generation of the plurality of signal levels, the controller is to then transition to an intermediate state and stay in the intermediate state for a predetermined number of clock cycles prior to entering the first state.

10. The IC device of claim 6 wherein the link has a plurality of lanes, each lane having a separate I/O buffer, and wherein the state machine controller is to update one of i) a reference level, ii) driver termination, and iii) receiver termination in the separate I/O buffer, in every lane, based on the same stopped value of the counter.

11. The IC device of claim 6 wherein the state machine controller is to enter an intermediate state while transitioning from the first state to the second state, wherein in the intermediate state the controller continues to signal the calibration circuit to generate said one of the plurality of signal levels that was generated while in the first state, and signals a second one of the plurality of signal levels to be generated.

12. A system comprising:
  a processor;
  main memory; and
  an integrated circuit (IC) device which is communicatively coupled to the processor and the main memory and provides the processor with I/O access, the IC device having
    an analog front end (AFE) with an I/O buffer, the I/O buffer having a driver and a receiver for a serial point to point link, the driver and the receiver having digitally-controllable transmission line terminations, respectively, the I/O buffer having a digitally-controllable reference level,
    a standalone calibration circuit to calibrate a plurality of signals against an external, reference resistor, and
    a state machine controller to transition through a first state, a second state, and a third state, wherein in each state, the controller is to control a signal generated by the calibration circuit until the signal has reached a calibrated level and then update one of i) the reference level of the I/O buffer, ii) the driver termination in the I/O buffer, and iii) the receiver termination in the I/O buffer, based on the calibrated level, and wherein the state machine controller enters the first state before entering the second state so that the calibrated level of the second state is obtained based on the calibrated level of the first state.

13. The system of claim 12 wherein the AFE has a plurality of I/O buffers, each having a driver and receiver, to support a plurality of lanes of the link, respectively, and
  wherein the state machine controller is to update one of i) a reference level, ii) driver termination, and iii) receiver termination for every one of the plurality of lanes based on the same calibrated level.

14. The system of claim 12 wherein the state machine controller implements counter logic having a thermometer-encoded output that represents the signal generated by the calibration circuit.

15. The system of claim 12 wherein the IC device is part of a root complex.

16. The system of claim 15 wherein the IC device is a memory controller hub.

17. The system of claim 15 wherein the IC device is an I/O controller hub.

* * * * *